June 7, 1949. R. STILLWELL 2,472,732
RANGE FINDER MOUNTING FOR CAMERA LENS TURRETS
Filed May 27, 1946
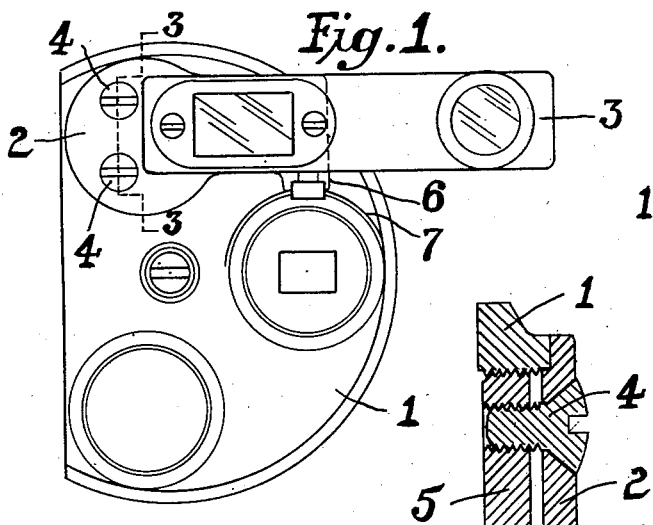
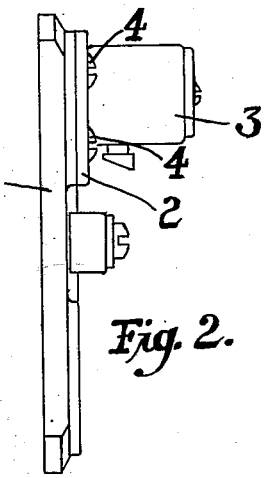
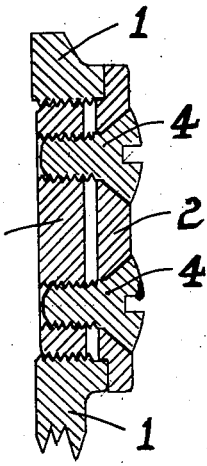
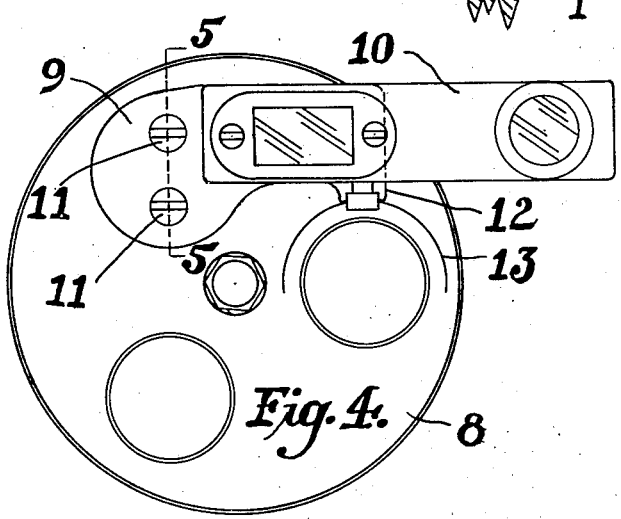
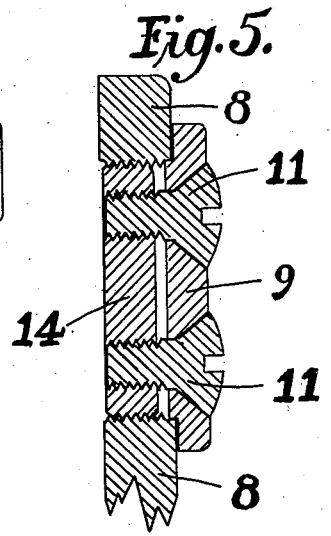
INVENTOR
Ralph Stillwell Patented June 7, 1949

2,472,732

UNITED STATES PATENT OFFICE 2,472,732

RANGE FINDER MOUNTING FOR CAMERA LENS TURRETS

Ralph Stillwell, Baldwin, N. Y.

Application May 27, 1946, Serial No. 672,570

2 Claims. (Cl. 95—44)

My invention relates to the mounting of a rangefinder on 8 and 16 mm. turret motion picture cameras, by utilizing one of the threaded lens mounts in the turret, for holding the rangefinder securely to the turret face; thereby, enabling the rangefinder to be placed in the proper, rigid position, for synchronized coupling to the lens.

I attain this end, by the device illustrated in the accompanying drawing, in which—

Fig. 1, a front view of a rangefinder mounted on a semi-circular turret as used on one type of motion picture camera.

Fig. 2, a side view of same.

Fig. 3, a cross section of Fig. 1, at the line 3—3.

Fig. 4, a front view of a rangefinder mounted on the full circular turret as used on other motion picture cameras.

Fig. 5, a cross section of Fig. 4, at the line 5—5.

Numerals refer to similar parts throughout the several views.

The rangefinder 3 and the mounting plate 2, Fig. 1, are as one unit, being held together by four (4) screws (not shown) and is attached to the turret front by screwing the threaded insert 5, Fig. 3, almost to the bottom of the threaded lens mount 1, as shown in Fig. 3. The rangefinder unit 3 and 2 is placed against the turret front and located in the proper position by means of the machined boss on back of the mounting plate 2, as shown in Fig. 3.

The screws 4—4 are inserted through the mounting plate, into the threaded insert 5 and tightened, being sure that the lug 6 is resting on the lens base 7, Fig. 1, which places the rangefinder in a true horizontal position and assures an accurate connection between the rangefinder contact shoe and the lens focusing ring shoulder.

Figs. 4 and 5 are to illustrate the same application on a camera with a full circular turret in which the screws 11—11, Fig. 4, are located on the center line of the threaded insert 14, Fig. 5, instead of offset as in Fig. 1.

The lug 6, Fig. 1, is machined shorter or longer, depending on the diameter of the bases on the different lenses used for rangefinder coupling.

Attaching this rangefinder to a motion picture camera, does not interfere with the turret indexing in any way, and is strong enough to be used as a handle for indexing, if desired.

This attachment replaces one of the lenses in the turret; therefore, only two (2) lenses can be attached at one time, but the convenience of a synchronized rangefinder coupled to the desired lens makes this worth while.

I claim:

1. In a movie camera having a rotative turret formed with several screw threaded openings into one of which a lens having a rotative focusing ring is mounted, means for supporting a range finder from one of the threaded openings adjacent the threaded opening provided with the lens with the operating lug of the range finder engaging the focusing ring of the lens, comprising a mounting plate attached at one end to the range finder and having its other end overlying the desired threaded opening of the turret, an insert threaded into the desired threaded opening of the turret, said mounting plate and said insert being formed with aligned threaded holes, and screws threaded into said threaded holes securing said mounting plate to said insert, said mounting plate being thinner than the material of said turret so that when said screws are tightened said mounting plate will be caused to frictionally abut the adjacent face of the material of the turret surrounding the desired threaded opening drawing forward on said insert securing said insert against rotative movement within the desired threaded opening.

2. In a movie camera having a rotative turret formed with several screw threaded openings into one of which a lens having a rotative focusing ring is mounted, means for supporting a range finder from one of the threaded openings adjacent the threaded opening provided with the lens with the operating lug of the range finder engaging the focusing ring of the lens, comprising a mounting plate attached at one end to the range finder and having its other end overlying the desired threaded opening of the turret, an insert threaded into the desired threaded opening of the turret, said mounting plate and said insert being formed with aligned threaded holes, and screws threaded into said threaded holes securing said mounting plate to said insert, said mounting plate being thinner than the material of said turret so that when said screws are tightened said mounting plate will be caused to frictionally abut the adjacent face of the material of the turret surrounding the desired threaded opening drawing forward on said insert securing said insert against rotative movement within the desired threaded opening, and a circular boss formed on the back face of said mounting plate and projecting slightly into the desired threaded opening of the turret forward of said insert for assisting in aligning the threaded holes of said mounting plate with the threaded holes of said insert.

RALPH STILLWELL.

REFERENCES CITED

The following references are of record in the file of this patent:

UNITED STATES PATENTS

| Number | Name | Date |
|---|---|---|
| 1,154,966 | Brown | Sept. 28, 1915 |
| 1,675,555 | Howell | July 3, 1928 |
| 1,733,511 | Mueller | Oct. 29, 1929 |
| 1,742,661 | McClintock et al. | Jan. 7, 1930 |
| 2,005,014 | Tondreau | June 18, 1935 |
| 2,061,643 | Wolff | Nov. 24, 1936 |

FOREIGN PATENTS

| Number | Country | Date |
|---|---|---|
| 407,888 | Great Britain | Mar. 29, 1934 |